United States Patent [19]
Carder et al.

[11] 3,712,495
[45] Jan. 23, 1973

[54] CARGO TRANSPORTER

[75] Inventors: Victor H. Carder, Carmel; Robert J. Notman, Salinas, both of Calif.

[73] Assignee: Cochran Western Corporation, Salinas, Calif.

[22] Filed: Nov. 3, 1970

[21] Appl. No.: 86,475

[52] U.S. Cl. ................... 214/520, 214/75 R, 214/84
[51] Int. Cl. ............................................... B60p 1/44
[58] Field of Search ..... 214/518, 520, 75 R, 75 T, 84; 198/127

[56] References Cited

UNITED STATES PATENTS

| | | | |
|---|---|---|---|
| 1,204,049 | 11/1916 | Maxwell | 214/84 |
| 1,756,653 | 4/1930 | McArthur | 198/127 R |
| 2,334,124 | 11/1943 | Peterson | 214/84 |
| 2,949,197 | 8/1960 | Lomen et al. | 214/75 T |
| 3,011,665 | 12/1961 | Wise | 214/84 |
| 3,204,797 | 9/1965 | Chandler | 214/518 |
| 3,435,969 | 4/1969 | McCartney et al. | 214/84 |
| 3,447,665 | 6/1969 | Egeland et al. | 214/84 |
| 3,575,309 | 4/1971 | Peterson | 214/520 |

Primary Examiner—Robert J. Spar
Attorney—Flehr, Hohbach, Test, Albritton & Herbert

[57] ABSTRACT

Mobile apparatus for loading and unloading aircraft, particularly for loading, transporting and unloading cargo containers of the preloaded module type. A mobile vehicular frame powered for movement over the ground is provided with vertically spaced fixed loading platforms and an elevator platform mounted for movements between positions of registry with said fixed loading platforms. Each of the fixed and elevator loading platforms is provided with powered, independently operable conveying means. The elevator platform carries controls for the elevator hoist and the drives for the conveying means. The conveying means of the fixed loading platforms are alternatively actuated by movement of the elevator platform from one position of registry to the other. Using the elevator platform, empty cargo modules discharged from the aircraft can be loaded onto one of the fixed loading platforms, and full cargo modules (e.g., galley modules) can be unloaded from the other fixed platform for transfer into the aircraft.

8 Claims, 16 Drawing Figures

INVENTORS
Victor H. Carder
Robert J. Notman
BY Flehr, Hohbach, Test,
Albritton & Herbert
Attorneys

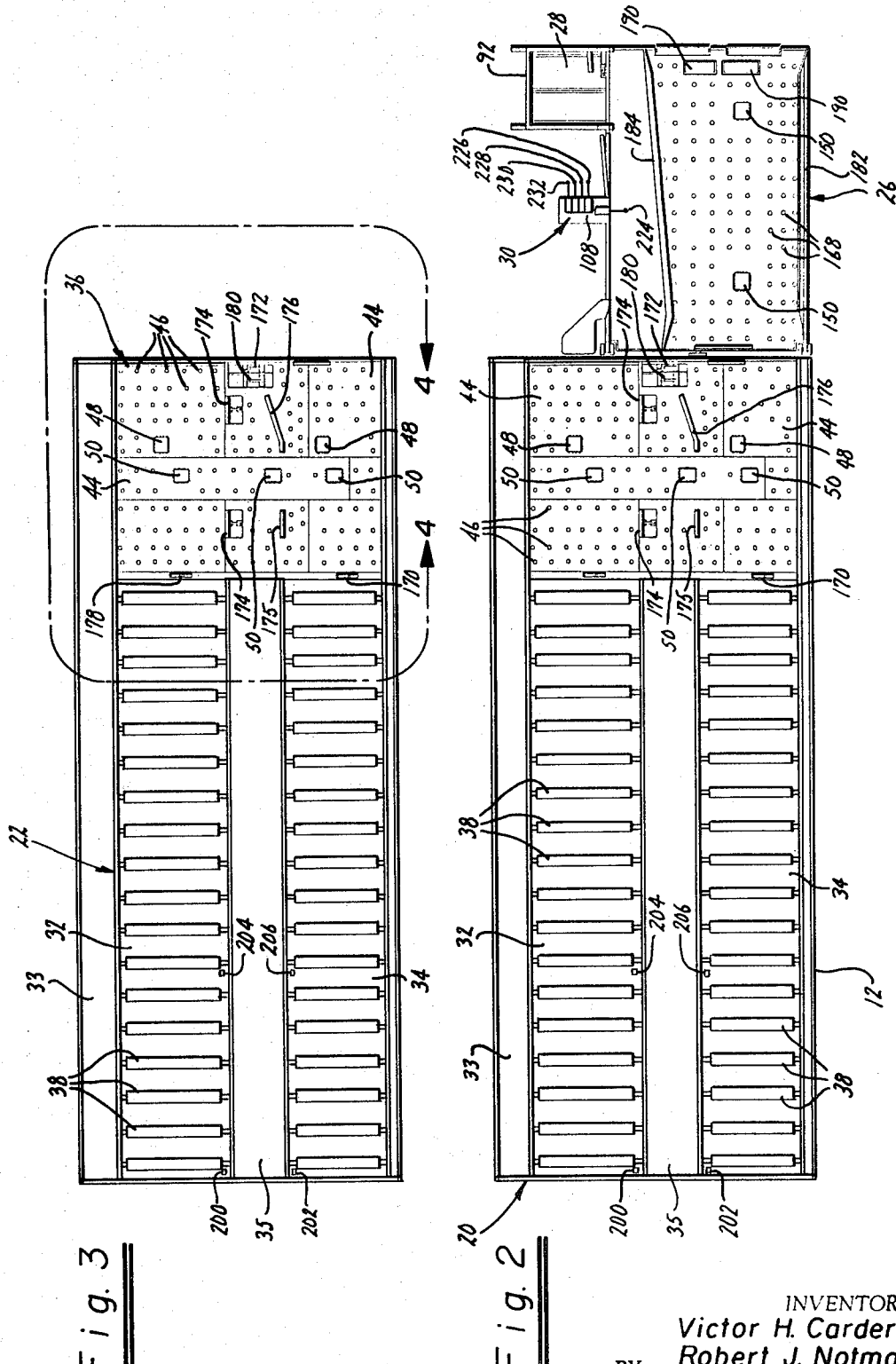

INVENTORS
Victor H. Carder
BY Robert J. Notman
Flehr, Hohbach, Test,
Albritton & Herbert
Attorneys

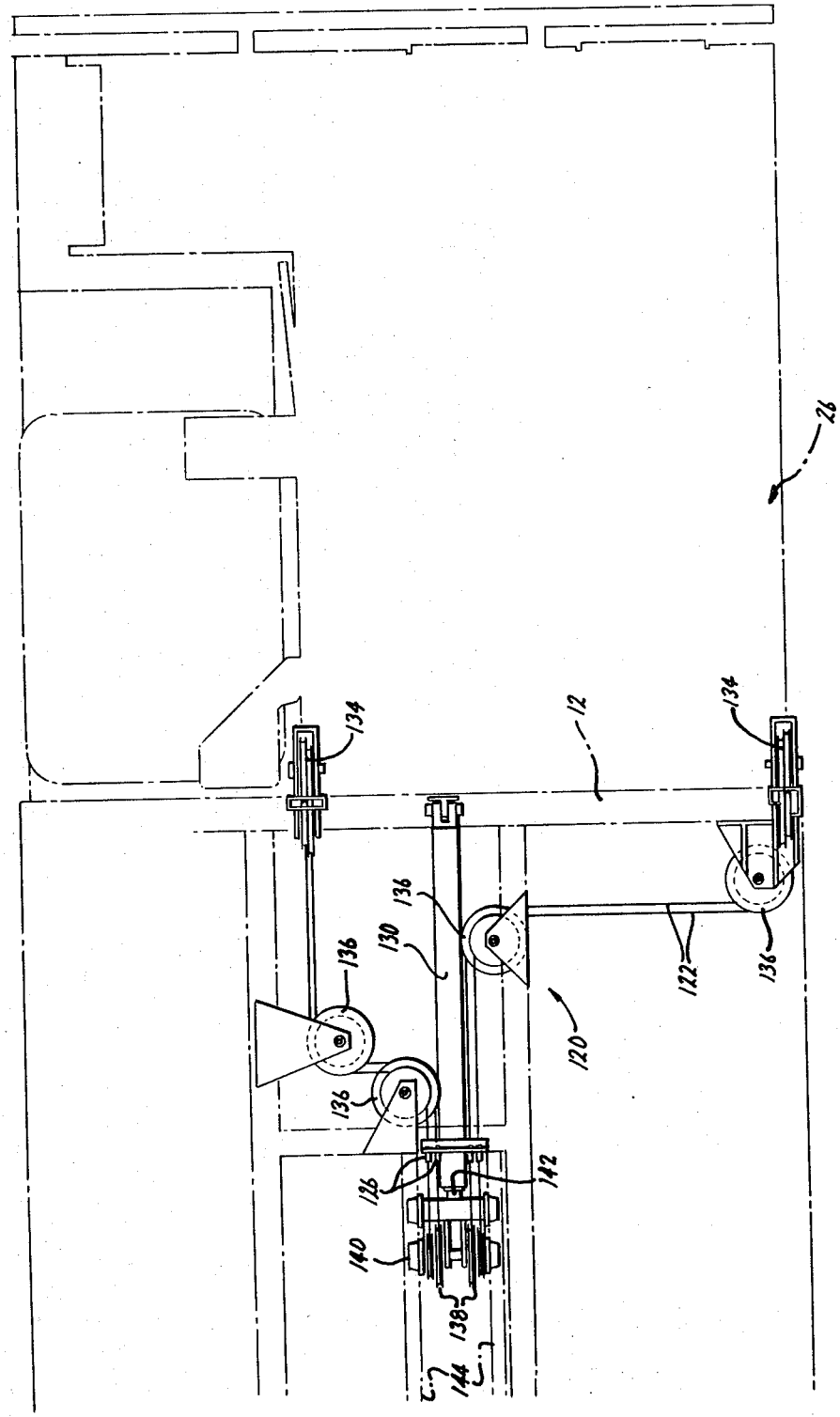

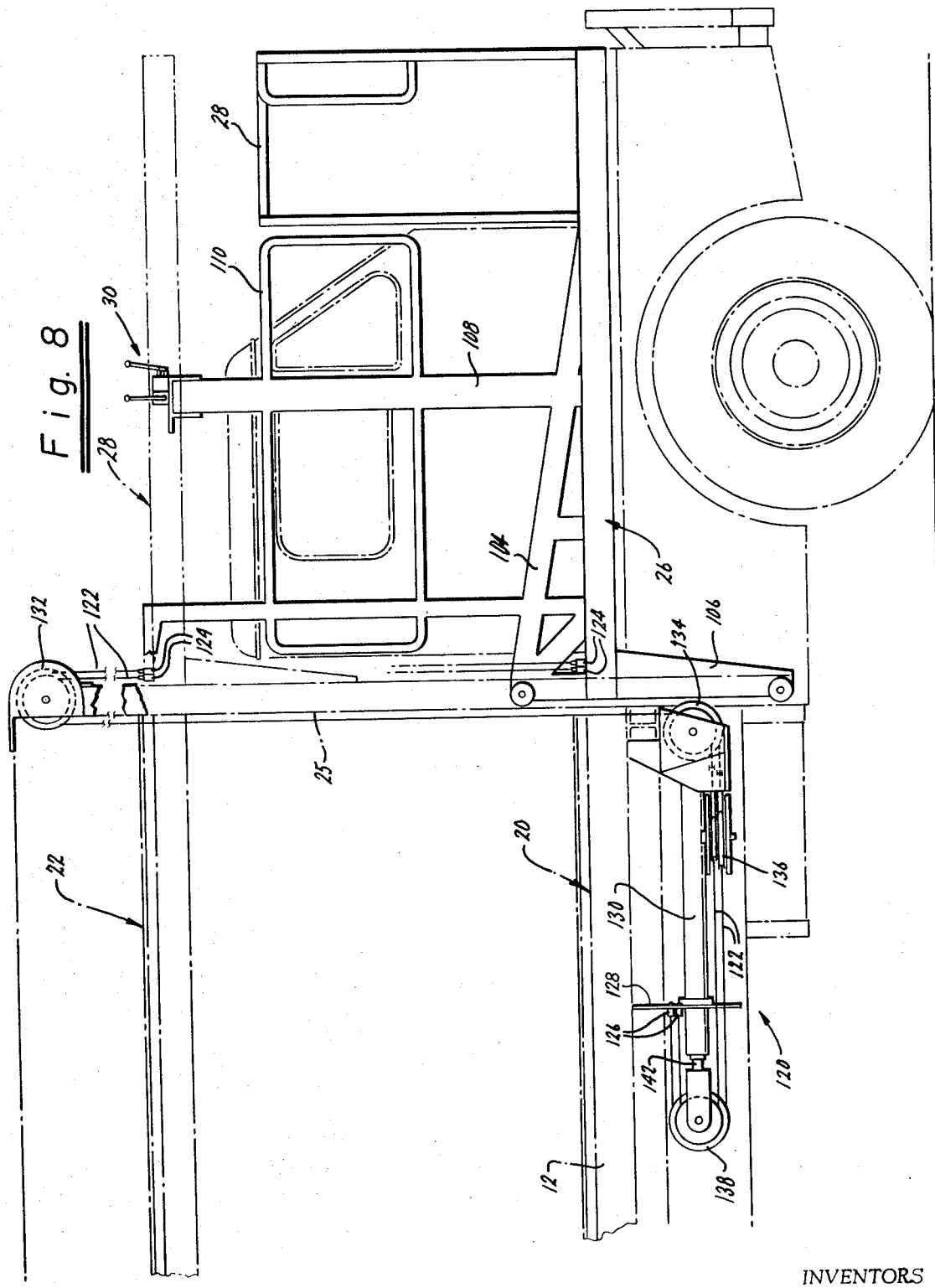

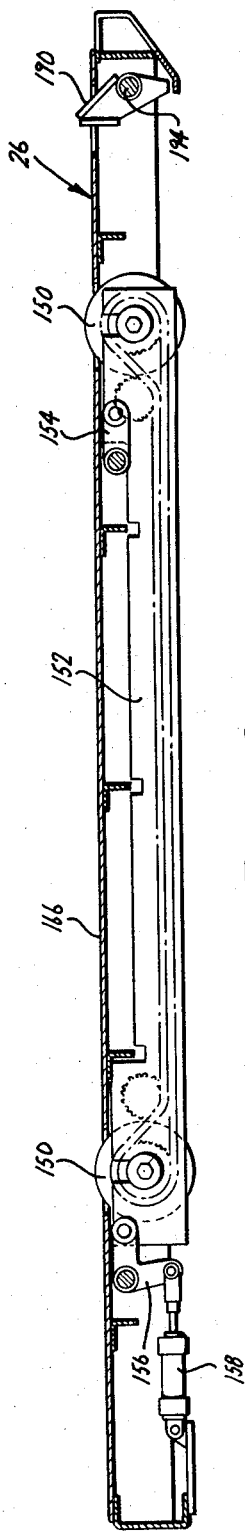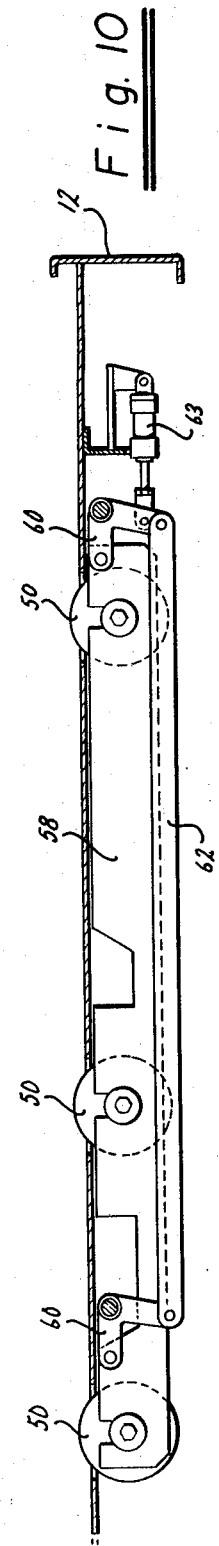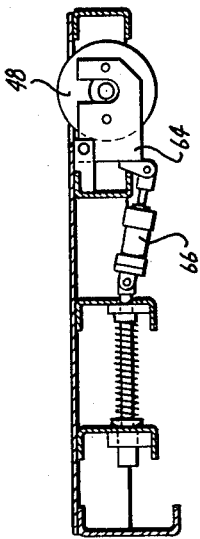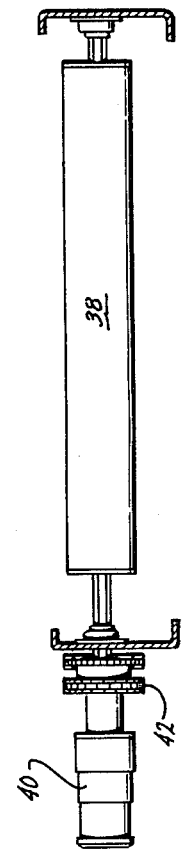

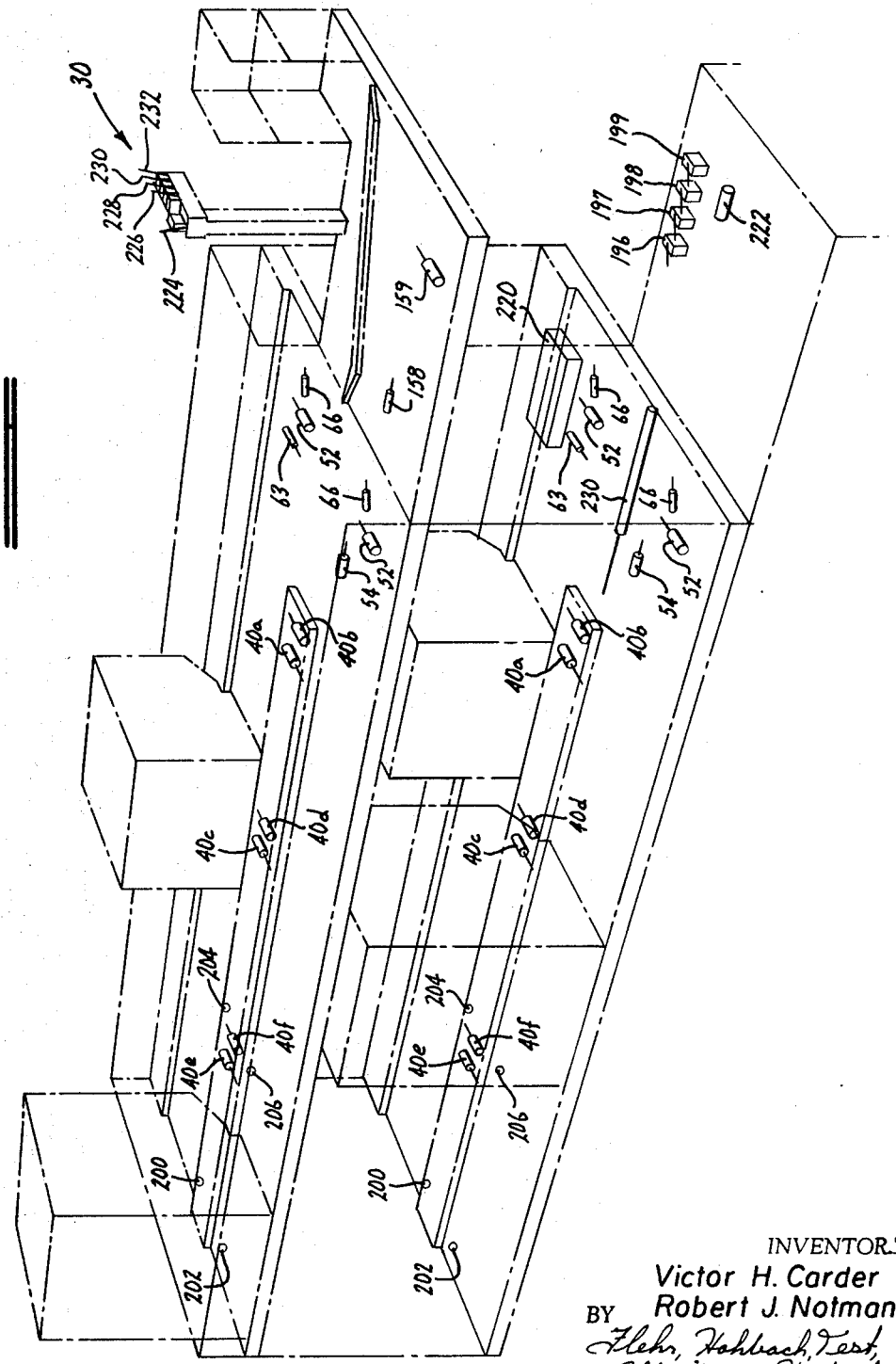

CARGO TRANSPORTER

BACKGROUND OF THE INVENTION

This invention relates generally to mobile cargo handling apparatus, and particularly to improved mobile apparatus useful in the loading and unloading of preloaded cargo modules with respect to aircraft and like commercial carriers.

Although baggage and cargo transporters of the type described are widely used by the aircraft industry, the dramatic increase in the tonnage of cargo and numbers of passengers carried by aircraft in recent years has necessitated rapid change in cargo handling systems. For example, one relatively efficient system devised for moving cargo from storage areas into the body of large multijet aircraft makes use of a loader positioned adjacent the cargo door of the aircraft. The loader receives the cargo from the transporter and lifts the same to the level of the plane's cargo compartment for easy loading into the aircraft fuselage. Large cargo modules can be accommodated. For example, most large passenger airlines now rely on the use of galley modules containing prepared meals for the large number of passengers moved by the aircraft. There is consequently a particular need for a highly efficient system to effect loading and unloading of galley modules and like cargo containers of the type described into the body of the aircraft. There is a particular need for such systems making use of relatively high speed mobile transporters which are adapted to rapidly load and unload the modules and other cargo containers.

SUMMARY OF THE INVENTION AND OBJECTS

In summary, the present invention relates to mobile loading apparatus for relatively heavy cargo containers such as galley modules and the like. The apparatus includes a steerable frame or chassis powered for ground movement. Upper and lower loading platforms are arranged in spaced relation on the chassis. An elevator platform which preferably is on a forward end of the chassis is mounted for movement between separate positions of registry adjacent said upper and lower loading platforms. Each of the loading platforms and the elevator platform is provided with independently operable conveying means to move cargo modules to and from storage positions on the spaced loading platforms. In a preferred embodiment, means to control the operation of the elevator and the separate platform conveying means is carried by the elevator so that a single operator can control the loading and unloading of a plurality of cargo modules on and off the mobile carrier. The operation of the separate conveying means on the loading platform is further controlled by movement of the elevator platform so that the conveying means of the upper and lower platforms will alternatively function at positions of registry with the elevator platform.

The mobile transporter of the present invention is particularly useful with intermediate loading apparatus of the type disclosed for example in U.S. Pat. No. 3,524,563, to receive empty cargo modules such as galley modules and to discharge preloaded galley modules for use aboard the aircraft. The apparatus of the present invention is particularly useful in the loading and unloading of large numbers of such cargo modules in a relatively short period of time.

An object of the present invention is to provide an improved cargo transporter in the form of mobile loading apparatus adapted to rapidly loading and unloading cargo modules or like heavy bulky items of cargo with respect to aircraft.

Another object of the invention is to provide mobile cargo transporter apparatus of the type described and adapted to move a plurality of cargo modules to and from transport positions on a mobile frame, wherein such operations may be easily controlled by a single operator.

Another object of the invention is to provide a cargo transporter apparatus of the type described which employs cooperating elevator and loading platforms, each provided with independently operable conveying means to receive or discharge cargo modules in a selectively controlled operation.

A further object of the invention is to provide loading apparatus for cargo modules of the type described wherein the cargo handling and loading platforms are mobile so that the apparatus may be employed both as a transport vehicle and as cargo handling means.

These and other objects of the invention will be apparent from the following description of an exemplary embodiment and from the drawings.

BRIEF DESCRIPTION OF THE DRAWINGS

FIG. 2 is a view in plan along the line 2—2 of FIG. 1.

FIG. 3 is a like view along the line 3—3 of FIG. 1.

FIG. 7 is a view like FIG. 4, wherein additional portions of the platform have been removed to show details of the elevator hoist mechanism.

FIG. 8 is a view in side elevation of the elevator platform and hoist mechanism, shown in FIGS. 6 and 7.

FIG. 9 is a view in section along the line 9—9 of FIG. 5.

FIG. 10 is a view in section along the line 10—10 of FIG. 5.

FIG. 11 is a view in section along the line 11—11 of FIG. 5.

FIG. 12 is an enlarged view in section along the line 12—12 of FIG. 6.

FIGS. 13 and 14 are, respectively, schematic and diagrammatic views illustrating a control system for the mobile loading apparatus of the present invention.

DESCRIPTION OF PREFERRED EMBODIMENTS

General Description

Figure 1:
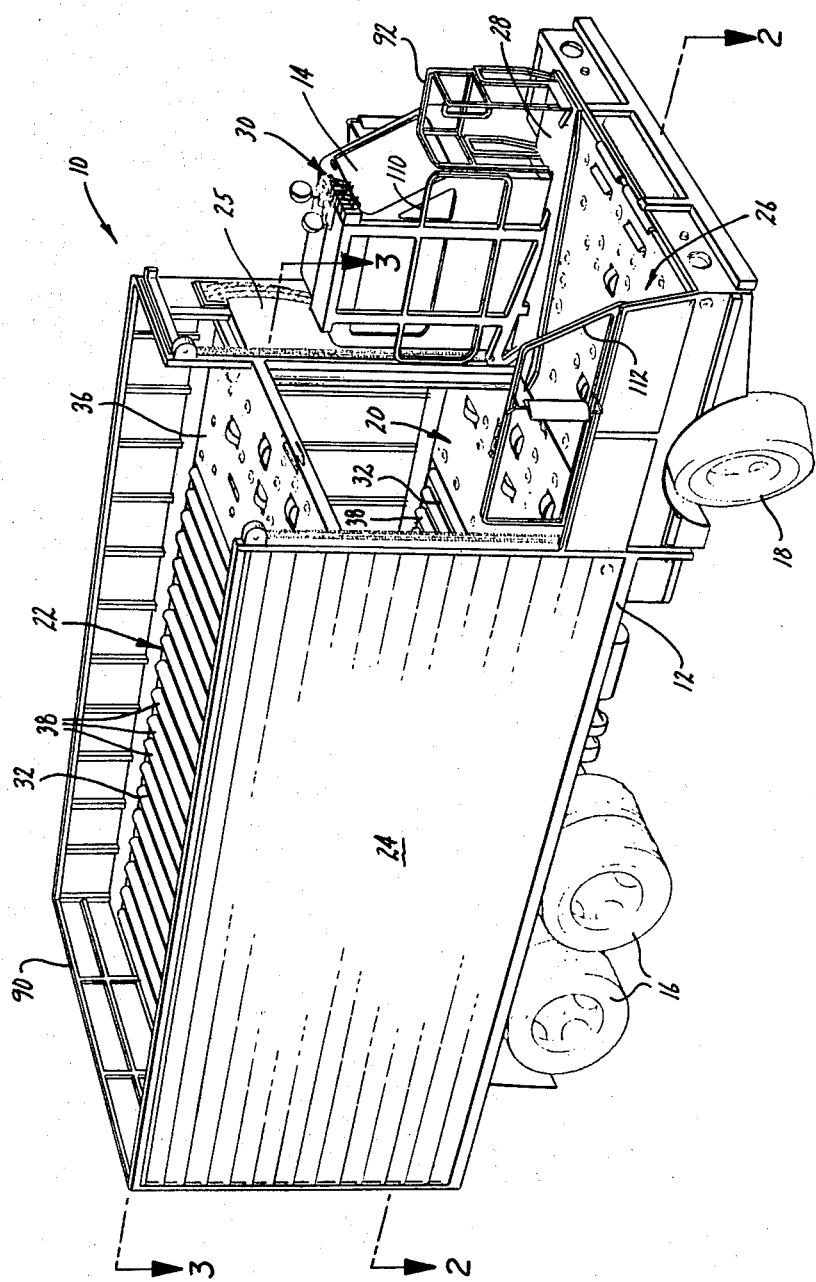
FIG. 1 is a perspective view of an embodiment of mobile loading apparatus according to the present invention.

Referring to the drawings, 10 represents a cargo transporter in the form of mobile loading apparatus which is especially useful in the handling of preloaded cargo containers such as galley modules. As shown in FIG. 1, the apparatus or vehicle 10 is provided with a wheel equipped chassis or frame 12 at the forward end of which is the driver's station or cab 14. The vehicle 10 is self-propelled, being driven by pairs of wheels 16 powered by a conventional internal combustion prime mover (not shown) and maneuvered by the steerable front wheels 18.

To facilitate loading and unloading of cargo modules from aircraft and the like, the vehicle 10 is provided with two fixed loading platforms, a lower loading platform 20 supported on the chassis 12 and an upper loading platform 22 likewise supported on the chassis in spaced relation above the lower platform. Any suitable means may be employed for holding the separate loading platforms in spaced relation, for example, a body or frame enclosed within the side and end panels 24, 25. Mounted on a forward end of the chassis for vertical movements between separate positions of registry with the loading platforms 20 and 22, is an elevator platform 26. As hereinafter described, the elevator platform is provided with an operator's station 28, and a control panel 30, providing independent control over the operations of both the elevator and powered conveyor means on each of the loading and elevator platforms.

In use, the cargo transporter 10 is loaded with a supply of pre-packed cargo modules (usually on the lower platform) and driven to a loading position adjacent an aircraft. As noted previously, the transporter 10 is normally employed in conjunction with intermediate loading apparatus (not shown) which has one or more adjustable elevators to discharge or receive cargo containers, and which is positioned between the transporter 10 and the aircraft. In a typical operation, the elevator platform 26 of the cargo transporter is first positioned adjacent the upper platform 22 and the transporter conveying means operated to receive empty cargo modules from the aircraft, for example, as delivered by the intermediate loader. The elevator platform 26 is then lowered to a position adjacent the lower platform 20, and the transporter conveying means operated to discharge the pre-packed cargo modules in sequence from the lower platform to the intermediate loader, and from the intermediate loader into the aircraft. All of the described unloading and loading operations can be performed at station 28 by operation of the controls at panel 30. A single operator is thus able to rapidly perform the entire loading and unloading operation, in safe, convenient fashion, from a position on the transporter elevator platform 26.

Lower Loading Platform

The lower loading platform 20 is supported directly on the transporter frame 12 and is generally provided with separately operable conveying means to move individual cargo modules transversely as well as lengthwise with respect to the vehicular frame of the transporter 10. The rear of the lower transporter compartment (not shown in FIG. 1) may be open to facilitate loading of pre-packed cargo units, for example, galley modules containing a variety of prepared meals and/or drinks. Such food and drink modules are customarily pre-packed at a central food processing facility, where meals are prepared in assembly line fashion for the large numbers of passengers moved by the aircraft.

Alternatively, of course, pre-packed modules may be loaded into the transporter 10 from the front, using the elevator platform 26, as hereinafter described.

Figure 5:
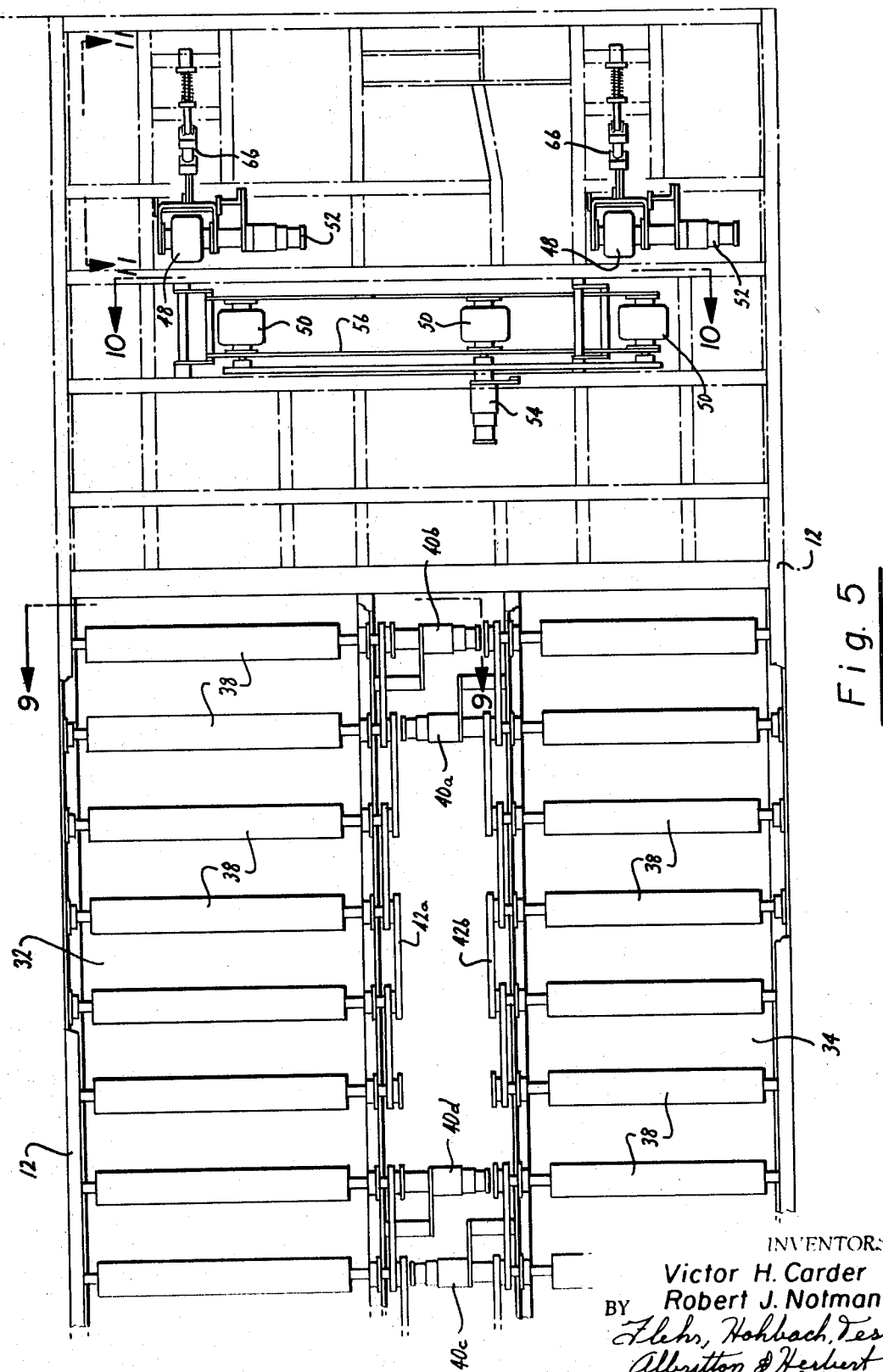
FIG. 5 is a view like FIG. 4, with portions of the platform removed to show the underlying structure.

Referring to FIGS. 1 and 2, the transporter is shown with the elevator 26 in a position of registry with the lower platform 20. With reference to the vehicular orientation of the cargo transporter, the platform 20 is provided with a left hand conveying pathway 32, a right hand conveying pathway 34, and a transverse conveying pathway or transfer area 36. As illustrated, each of the conveying pathways 32 and 34 is in the form of a plurality of roller conveyers 38 arranged in substantial parallelism and transverse to the direction of conveyance. As particularly shown in FIGS. 5 and 9, rotation of the various roller conveyers 38 can be accomplished by means of one or more motors 40, suitably linked to the spindles of the rollers by conventional chain and sprocket assemblies 42. Thus, FIG. 5 illustrates a forward group of rollers in the left hand pathway 32 powered by the motor 40b and chain and sprocket assembly 42a. A similar group of rollers in the right hand pathway 34 is driven by the motor 40a and chain and sprocket assembly 42b. Corresponding groups of the rollers 38 can be similarly driven by the motors 40c and 40d. For example, one satisfactory arrangement (See FIGS. 13 and 14) makes use of three independently operable groups of six roller conveyers 38, each operated by its own motor and chain drive assembly. As hereinafter described, such arrangement provides a desired degree of control over both conveying and module storage operations, performed at the conveyance paths 32 and 34.

Figure 4:
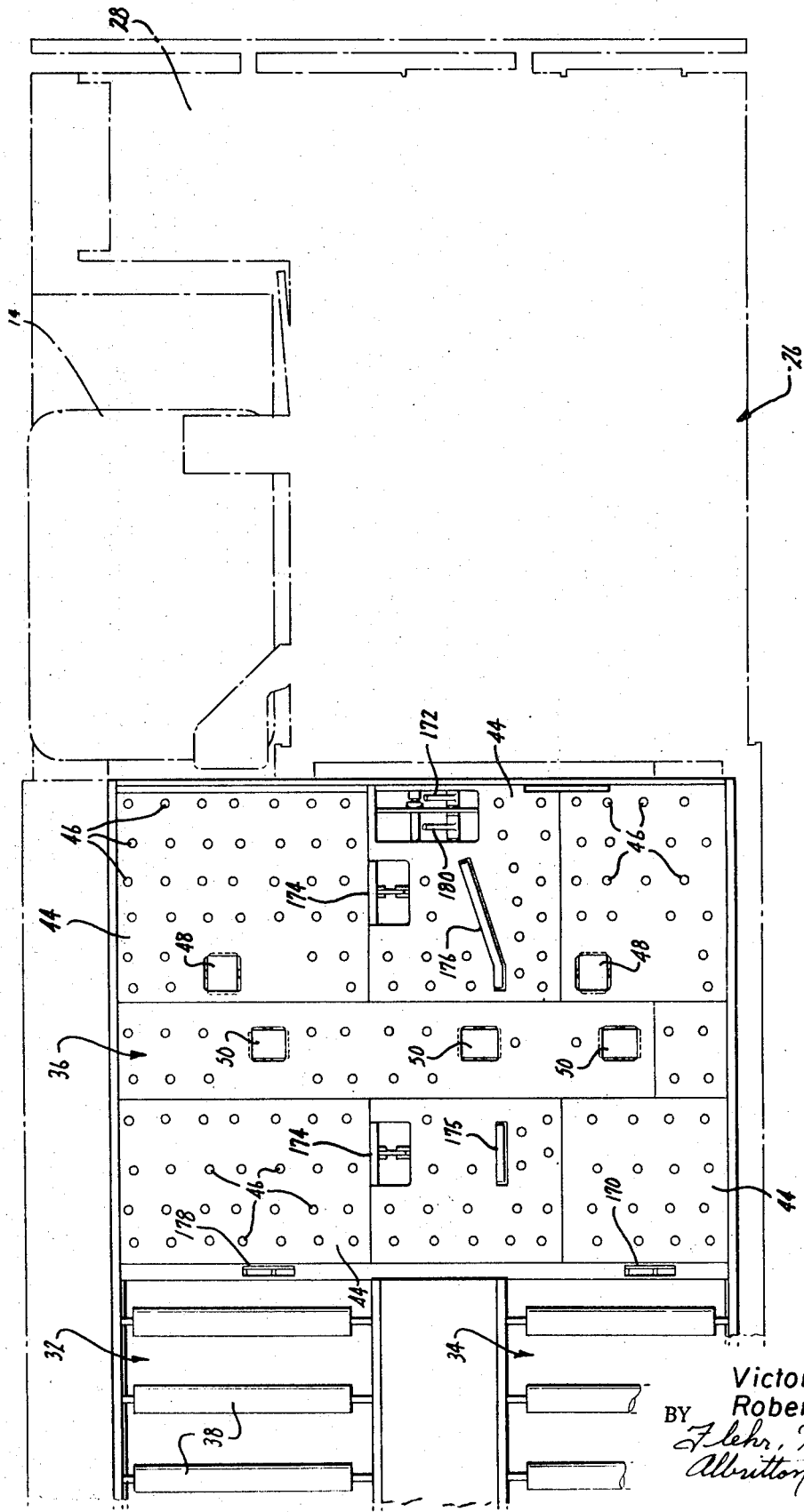
FIG. 4 is an enlarged view of a portion of a loading platform, enclosed by line 4—4 of FIG. 3.

As shown in FIGS. 1, 2 and 4, the transfer area 36 is positioned at a forward end of the loading platform 20, immediately adjacent the roller conveying pathways 32 and 34. The transfer area includes a number of decking plates 44 suitably provided with a plurality of ball casters 46 which assist the conveying means in the transfer operations related to the cargo modules. As noted previously, the transfer area 36 also includes independently operable conveyer means to move the cargo modules both lengthwise and transversely of the loading platform, to thereby facilitate movement of the cargo modules onto the elevator platform 26. Specifically, the transfer area 36 is provided with one or more conveying rollers or wheels 48 which cooperate with the conveying rollers 38 in providing lengthwise movements of the cargo modules. It also includes transverse conveying rolls or wheels 50 to effect a lateral transfer of the cargo modules between the roller conveyer path 32 and the main conveying path to the elevator platform 26 (represented at 76 and 82 in FIGS. 15 and 16). In this regard, it should be understood that the conveyers 38, 48 and 50 are each bi-directional, to facilitate both loading and unloading operations.

Referring to FIG. 5, the lengthwise conveying rollers 48 are each provided with a separate drive motor 52. The left hand motor 52 facilitates independent operation of the left hand conveyer 48 in conjunction with the roller conveyers of path 32. The right hand motor facilitates independent operation of the right hand conveyer 48 in conjunction with the conveying rollers of the elevator 26. Independent operation of the transverse roller conveyers 50 is similarly accomplished by means of drive motor 54. In this case, however, it is permissible to use a single drive motor to power all of the conveyers 50, for example, by means of the conventional chain drive assembly 56.

In general, both lengthwise and transverse conveying operations are performed at the transfer area 36. It is consequently desirable to provide means to prevent interference between the operations of the lengthwise conveyers 48 and the transverse conveyers 50. In the illustrated apparatus, such means comprise hydraulic cylinders which elevate the drive wheels above the elevation of the roller casters 46. Thus, as shown in FIG. 10, the transverse conveyers 50 are mounted for rotation in a support frame 58 which is pivotally carried by bell cranks 60. The latter cooperate with a parallelogram linkage 62 and actuating cylinder 63 to alternatively raise the conveyers 50 to the drive position shown in FIG. 10, or to lower the rollers 50 to an inoperative or out-of-the-way position (not shown). In like fashion, as shown in FIG. 11, the conveying rollers 48 may be individually supported in pivot mounts 64 actuated by the cylinders 66. Again, the conveyer 48 is shown in the up or drive position. It will be understood, however, that in the hereinafter described operation of the lower loading platform 20, the conveyers 48 will normally be pivoted to an inoperative, out-of-the-way position during periods of operation of the transverse conveyers 50, and vice versa. This is most easily accomplished by controlling the operations of the actuating cylinders for the separate conveyer components so that they operate to project the conveyers upwardly through the apertures in the decking 44, only at such time as the operator energizes the control for the particular transfer conveyer involved in the loading or unloading operation.

Figure 16:
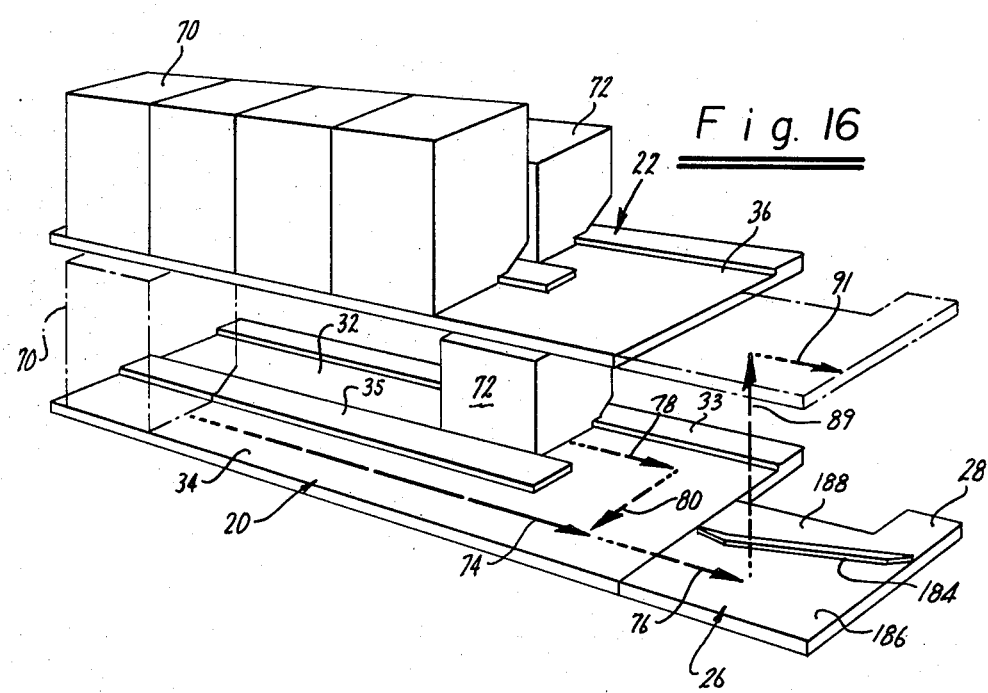

In general, the separate conveyer means described above facilitate movement of cargo modules, represented at 70 and 72 in FIG. 16, to and from the elevator platform 26. Thus, cargo modules 70 positioned at the right hand conveyer path 34, may be moved by the conveyers 38 and the right hand conveyer 48 onto the elevator platform 26 (arrows 74 and 76). In like fashion, cargo modules 72 stored at the left hand conveyer path can be moved by the left hand conveyers 38 and 48, the transverse conveyers 50 and the right hand conveyer 48, in a conveyance path that is both lengthwise and transverse to accomplish the same result (arrows 78, 80 and 76). As hereinafter explained, all such operations may be controlled by the operator at station 28 on the elevator platform.

As may be necessary in a particular loading or unloading operation, the operator may also manually transport cargo modules across the transfer area, on the ball casters 46, or along the roller conveyers 38 in the pathways 32 and 34. For such purpose, decking and suitable walkways are provided, as generally represented at 44, 33 and 35 (see FIGS. 3 and 4). Such operation is also facilitated by the normally retracted or lowered position of the conveyers 48 and 50.

Upper Loading Platform

As noted previously, the upper loading platform 22 is mounted in spaced vertical relation with respect to the lower platform. Suitable means for such purpose can include a body frame (not shown) within the side panels 24 and end panel 25, which generally form the super structure of the cargo transporter 10 (FIG. 1).

In other respects, the construction of the upper loading platform 22 can be identical to that of the lower loading platform 20. Such fact is particularly represented in FIG. 3 by use of corresponding reference numerals. Thus, the upper loading platform 20 generally includes a left hand conveyer pathway 32 and its associated walkway 33, a right hand conveyer pathway 34 and associated walkway 35, and a transfer area 36. The construction and operation of the conveying means in each of these conveyance areas, namely the conveying rollers 38 and the transfer rollers or wheels 48, 50, can likewise be identical to that previously described in connection with the lower loading platform 20.

It may be noted that movement of cargo modules on the upper loading platform 22, in loading and unloading operations, will likewise be identical to that previously described with respect to the lower loading platform 20. Thus, movement of cargo modules between the elevator 26 and the left hand conveyance pathway 32 will occur along a lengthwise and transverse conveyance path (arrows 82, 84 and 86), whereas movement of the cargo modules between the elevator and the right hand conveyance path 34 will occur along a lengthwise conveyance path (arrows 82 and 88).

As hereinafter explained, the described handling of the cargo modules is generally accomplished in conjunction with cooperating movements of the elevator platform 26. However, as may be necessary in loading and unloading operations at a centralized airport facility, cargo may also be loaded or unloaded at the rear of the cargo transporter 10, through use of removable rear gates such as the gate 90 shown in FIG. 1.

Elevator Platform

It is a feature of the present invention that the aircraft loading and unloading operations of the cargo transporter 10 are performed through controlled operations of an elevator platform, generally represented at 26, at alternate positions of registry with the separate loading platforms 20 and 22. As best illustrated in FIGS. 1, 2 and 8, the elevator platform 26 is mounted for vertical movements at the forward end of the cargo transporter 10, from which point all loading and unloading operations may be controlled by an operator standing within station 28 and manipulating the controls at panel 30. The operator station 28 is appropriately provided with a protective guard rail 92 which may be pivoted out of the way to facilitate movements of the operator between the vehicle cab 14 and the station 28.

Figure 6:
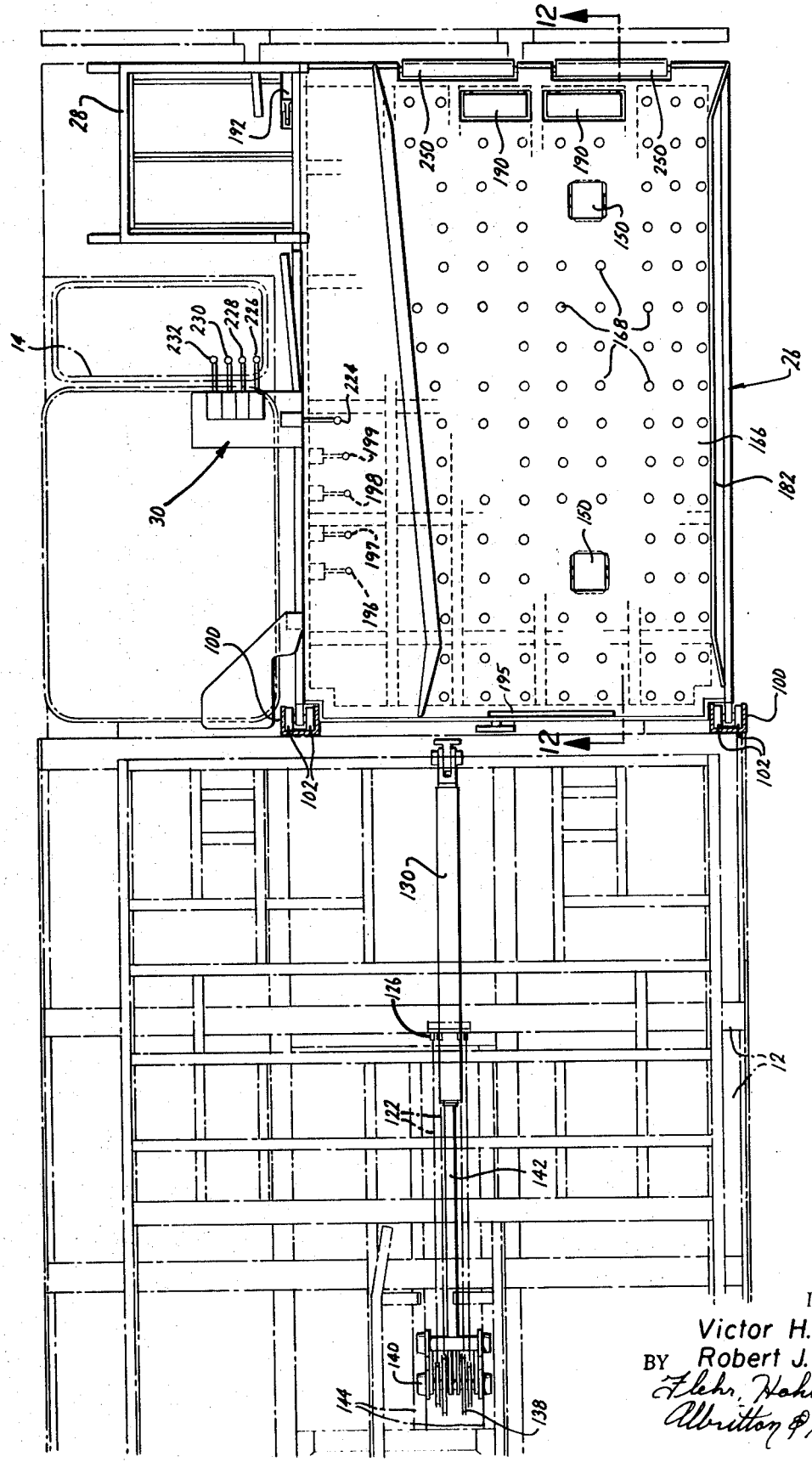
FIG. 6 is a view like FIG. 4, showing also the elevator platform and portions of the hoist mechanism therefore.

Referring to FIGS. 1 and 6-8, the elevator platform is guided during vertical movements with respect to the loading platforms 20 and 22 by means of horizontally spaced vertical tracks or guideways 100, which are mounted on the vehicular frame to receive rollers 102 carried by the elevator platform 26 (See FIG. 6). As illustrated, the rollers 102 are carried in spaced vertical relation by upwardly and downwardly projecting portions of the elevator frame, generally represented at 104 and 106 (FIG. 8). The elevator platform also includes an upstanding support 108 for the control panel 30, at a convenient distance from the operator station 28. Suitable guard rails 110 and 112 may also be provided to insure the safety of the operator at elevated positions of the platform 26.

Movement of the elevator platform 26 between upper and lower loading positions, in registry with the platforms 20 and 22, is accomplished by means of the hoist mechanism generally represented at 120 (FIGS. 7 and 8). In the illustrated apparatus, the hoist mechanism 120 is in the form of a cable hoist employing cables 122 attached at one end 124 to the elevator platform at the other end 126 to a clamp plate 128 adjacent a hydraulic ram 130. As shown in FIGS. 7 and 8, the cables 122 are reaved about upper and lower sheaves 132 and 134, and intermediate horizontal and vertical tensioning sheaves 136 and 138. As shown in FIG. 7, the pulleys 138 are carried on a guide trolley assembly 140 connected to the piston 142 of the ram 130, and adapted upon actuation of the ram to longitudinal movements within the horizontal trackway 144. Upon actuating the ram to extend the trolley assembly 140 to the position show in FIG. 6, the cables 122 function to raise the elevator platform 26 to a position of registry with the upper platform 22, as generally represented by the dotted line positions in FIGS. 8 and 16. Upon actuating of the ram 130 to retract the trolley assembly 140, the weight of the elevator platform will cause it to descend to a position of registry with the lower platform 20, as represented by the full line positions of the same in FIGS. 8 and 16. The hoist mechanism 120 thus functions at the extreme positions of the ram's piston 142 to achieve the described positions of registry of the elevator 26 with the upper and lower loading platforms 20 and 22 (dotted and full line positions in FIG. 16).

As generally shown in FIGS. 1 and 2, the elevator platform 26 is provided with separate conveying means 150, adapted to cooperate in loading and unloading operations with the conveying means of the platforms 20 and 22. As specifically illustrated in FIGS. 6 and 12, the conveying means 150 are in the form of independently operable rollers or wheels similar in construction to the conveyers 48 or 50 of the loading platforms. In like fashion, the conveyers 150 may be rotatably mounted within a frame 152 which may be supported for pivotal movements between raised and lowered positions by links 154 and bell cranks 156. The latter are responsive to actuation of the cylinder 158 to move the conveyers 150 between the raised position illustrated in FIG. 12 and an inoperative or out-of-the-way position below the decking 166 of the platform (not shown). As in the case of the loading platforms 20 and 22, the elevator platform 26 is provided with a plurality of ball casters 168 to assist in the transfer of cargo modules across the elevator platform.

Figure 15:
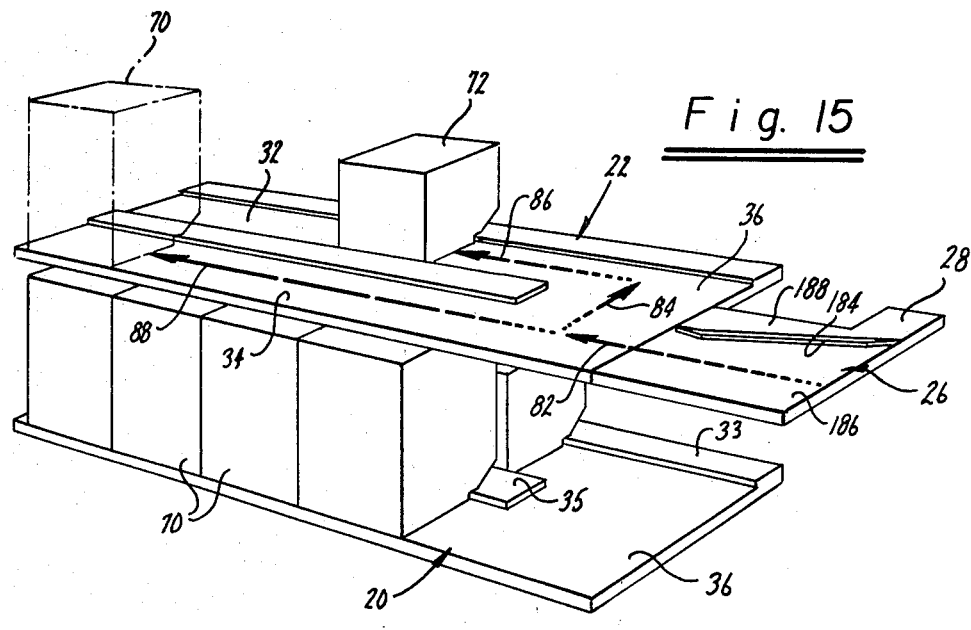
FIGS. 15 and 16 are schematic views illustrating typical loading and unloading operations with respect to the apparatus of the present invention.

The cooperating function of the conveyer means on the elevator platform 26 is schematically represented in FIGS. 15 and 16. Thus in a loading operation with respect to the platform 22 (FIG. 15), the conveyer means 150 function to move the cargo modules onto the transfer area 36 (arrow 82), from which point the cargo may be moved directly by the right hand conveying means 48 and 38 into the conveying path 34 (arrow 88) or, alternatively, by the transfer conveying means 50 and the left hand conveyers 48 and 38, into the conveyance path 32 (arrows 84 and 86). An unloading operation is likewise represented in FIG. 16, wherein movement of the cargo modules from the transfer area 36 to the elevator platform is represented by the arrow 76. In both the loading and unloading operations represented by the arrows 82 and 76 (FIGS. 15 and 16), the elevator conveyers 150 cooperate with the right hand conveyers 48 of the loading platforms to effect transfers between the loading and elevator platforms. Such movements are assisted by an appropriate spacing between the right hand conveyers 48 and the rear conveyer 150, as well as by the roller casters 44 and 168.

Cargo Guides and Stops

As noted above, each of the loading platforms 20 and 22 is provided with separate conveyance paths 32 and 34, which necessarily must converge at the transfer area 36 to facilitate conveyance to the single conveyance path represented by the conveyers 150 of the elevator platform 26. To insure that the cargo modules moving on one of the separate conveyance paths 32, 34 will not interfere with movements of cargo modules on the other, it is desirable to provide cooperating conveyer guides and stops. Conveyer stops are also desirable at the end of each of the conveyer platforms 20, 22 and 26 to insure that cargo modules will not accidentally fall from the transporter 10, and be damaged.

Referring to FIGS. 2 through 4, several groups of cooperating retractable guides and stops are illustrated, each provided with separate actuating mechanisms. One group composed of stop 170, is mounted to be depressed by upward movement of stop lever 172. Another group composed of four retractable guides 174, 174, 175 and 176 and a cooperating stop 178 is mounted to be raised by pulling up on the stop lever 180. Accordingly, when it is desired to transfer cargo modules to or from the conveyance path 34, the stop levers 172 and 180 are both pulled to the up position. In this position of the guides and stops, cargo modules moving between the elevator 26 and the conveyance path 34 will be restrained against lateral movements at the transfer area 36 by the guides 175 and 176. Cargo modules on the conveyance path 32 and on the left hand side of the transfer area 36 will be simultaneously restrained against undesired movements by the guides 174 and the stop 178. When it is desired to load or unload with respect to the conveyance path 32, the levers 172 and 180 are both depressed, raising the stop 170 and lowering the guides 174, 175, 176 and the stop 178. In this position, movements of cargo modules are restrained only with respect to lengthwise movements between the elevator 26 and the conveyance path 34, the cargo modules otherwise being free to move from the elevator across the transfer area 36 to the conveyance path 32.

Since the cargo modules follow a single conveyance path on the elevator platform 26, generally determined by the conveyers 150, fixed guides 182 and 184 can be provided on either side of this conveyance pathway. As will be apparent from FIGS. 2, 15 and 16, the guides 182 and 184 restrict lateral movements of the cargo modules as they move across the elevator platform, with the guide 184 additionally serving to maintain a clear pathway 188 for the operator moving from the control station 28 to the stop levers 172 and 180.

For obvious reasons, it is necessary that all movements of cargo modules with respect to the forward end of the elevator platform be under the control of the operator at station 28. Means for this purpose include forward stops 190 which are normally biased to a raised or stop position, but which may be depressed by operation of a foot pedal 192 at the station 28. As best illustrated in FIGS. 6 and 12, the stops 190 may be in the form of simple pivoted members mounted on a cross shaft 194, and held in the raised position by conventional torsion springs (not shown). As may be necessary, the stops 190 may be lowered by the foot pedal 192 in response to direct mechanical leverage. A similar stop 195 may be provided at the rear of the elevator platform 26.

Alternative Platform Control

Figure 14:
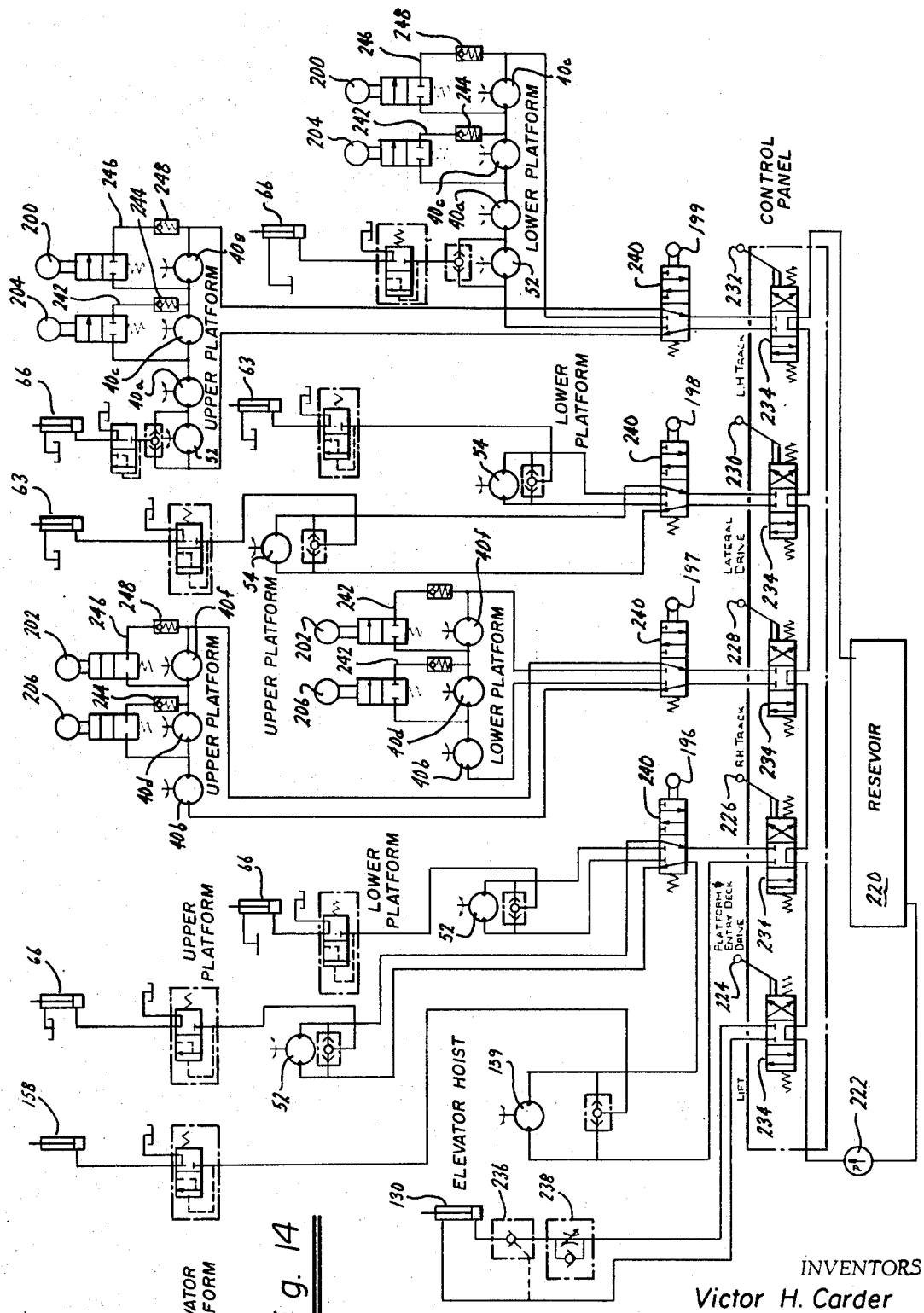

It is a feature of the present invention that means are provided, responsive to movements of the elevator platform 26, to separately and alternatively activate the independently operable conveying means (38, 48 and 50) of each of the fixed loading platforms 20 and 22. As illustrated in FIGS. 6, 13 and 14, this operating function may be achieved by a series of reversible selector valves 196, 197, 198 and 199, mounted on the vehicular frame 12 to be depressed by the elevator platform 26 when it is in a lowered position. As hereinafter explained, movement of the elevator platform to its lowered position (i.e., in registry with the loading platform 20), causes the selector valves 196–199 to actuate, respectively, the drive motor for the right hand conveyor 48, the drive motors for the series of roller conveyers 38 in the right hand conveyance path 34, the drive motor for the lateral drive conveyers 50 and the drive motors for the series of roller conveyers 38 in the left hand conveyance path 32. In such depressed position of the selector valves 196–199, the corresponding drive motors for the upper loading platform 22 will be de-activated or inoperative.

The selector valves 196–199 are normally biased into an up position. Upward movement of the elevator 26 therefore functions to immediately shift the selector valves 196–198 to de-activate the drive motors for the lower conveyers and to simultaneously activate the corresponding drive motors for the upper conveyers (viz., the left and right hand conveyers 38, 48 and the lateral conveyers 50). The net effect is that the separate conveying means on the loading platforms 20 and 22 automatically respond to movements of the elevator platform 26, thereby insuring that the respective conveying means will alternatively function at the separate positions of registry with the elevator platform 26. The operator is thus free to concentrate on the identical operations of the conveying means at the two loading and unloading levels without concern as to other operating controls, except the control for the elevator hoist 120.

Cargo Module Storage

As hereinafter described in detail, all of the loading and unloading operations can be controlled by the operator at station 28. However, at such times as cargo modules have moved to storage positions at the rear of the loader conveying paths 32 or 34, it is desirable that the conveyer rollers 38 beneath such modules be inactivated.

As noted previously, the roller conveyers 38 are independently operated, as groups, by the separate drive motors 40. Thus, with respect to the conveyance path 32, the forward group of rollers 38 is operated by the motor 40a, the middle group of rollers is operated by the motor 40c and the rear group of rollers by the motor 40e (See FIGS. 5, 13 and 14). As best illustrated in FIGS. 2 and 13, a cam actuated valve or cut-off 200 is positioned at the rear of the left hand conveyance path 32, to terminate operation of the rear motor 40e at such time as a galley module rolls into position above the cut-off. A similar cam actuated valve or cut-off 202 may be provided at the rear of the right hand conveyance path 34, for the drive motor 40f. A cam actuated cut-off 204 is also provided at an intermediate position of the left hand conveyance path 32, to terminate operation of the middle group of rollers 38 (i.e., at such time as a cargo module stops above the cut-off 204). Again, a similar cut-off 206 can be provided with respect to the right hand conveyance path 34. However, as hereinafter described, the hydraulic systems for the intermediate cut-offs 204, 206 are so constructed that they are inoperative until such time as movement of cargo modules thereover to a rearward position is no longer possible, due to the presence of previously conveyed modules.

In the apparatus herein described, the hydraulic cut-offs 200, 202, 204, 206 operate only in a loading operation of the conveyers 38 in the conveyance paths 32 and 34. That is, due to the direction of flow of hydraulic fluid to the motors 40, the hydraulic cut-offs will only operate when the conveyance rollers are rotating to convey cargo modules toward the rear of the transporter 10. Upon reversal of the direction of conveyance (toward the right in the drawings, FIGS. 2, 3, 5 and 13) the cut-offs 200, 202, 204 and 206 are inoperative, and therefore incapable of terminating operation of the drive motors 40.

Assuming a loading operation wherein a cargo module is moving to the rear of a conveyance path 32, the module will be conveyed over the cut-off switch 204 without actuating the same. Upon reaching the cut-off 200, the rear group of rollers 38 will cease to operate so that the cargo module may be retained in a storage position. However, the intermediate group of conveying rollers 38 will continue to operate to transport additional cargo modules to the rear until such time as a cargo module abuts a module in a storage position, and comes to rest above the cut-off 204. At this point, the cut-off 204 terminates operation of the drive motor 40c for the middle group of conveying rollers. The forward group of conveying rollers 38 continues to operate, however, until the conveying path 32 is filled with cargo modules in storage position. It will be appreciated that the described operation is identical with respect to the cut-off valves 202 and 206, and with respect to each of the loading platforms 20 and 22.

Control System

In the illustrated apparatus, an operator at station 28 is provided with a control for the elevator hoist 120 and controls for the drives of four separate conveyance paths at each loading level. These are: the left hand conveyance path 32, including the drive motors for the roller conveyers 38 and the left hand conveyer 48; the transfer area 36, including the drive motor for the lateral conveyers 50; the right hand conveyance path 34, including the drive motors for the right hand roller conveyers 38; and the conveyance path from the transfer area 36 across the elevator platform, including the drive motors for the right hand conveyer 48 and the elevator conveyers 150. The controls for these four separate conveyance paths are available to the operator at each loading level, or, more specifically at each position of registry of the elevator platform 26 with either the lower loading platform 20 or the upper loading platform 22.

The control system to achieve the foregoing drive functions is schematically represented in FIGS. 13 and 14, and generally comprises a hydraulic system making use of a tank or reservoir 220 for hydraulic fluid, and a pump 222. As illustrated, the pump delivers hydraulic fluid under pressure to each of the operating control valves at the control panel 30. Specifically, these controls include the lever 224 for the hoist mechanism 120, the lever 226 for the elevator platform and entry conveyers 150 and 48, the lever 228 for the roller conveyers 38 in the path 34, the lever 230 for the transfer conveyers 50, and the lever 232 for the left hand conveyer 48 and the roller conveyers 38 in the path 32. The hydraulic pump 220 may be of the conventional vane type, driven by the main propulsion unit for the cargo transporter 10. Each of the control levers is positioned to be reached by the operator at station 28 and may be manually operated to shift the three position spool valves generally represented at 234 in FIG. 14. To illustrate, the lever 224 may be operated to shift its three position spool valve 234 to the left from the neutral position shown to extend the hydraulic ram 130 to raise the elevator platform 26 and, alternatively, to the right to retract the hydraulic ram 130 to lower the elevator platform. In the latter operation, the flow of hydraulic fluid from the rear of the hydraulic ram must pass through the check valve 236 and flow control valve 238, thus providing a safety feature in that the elevator platform 26 will lock in position in the event the hydraulic pressure is lost through a broken line or stopping of the main propulsion engine.

As noted previously, the independently operable conveying means at the separate platform levels are separately and alternatively actuated by the selector valves 196, 19, 198 and 199. As illustrated in FIG. 14, the selector valves may be employed in conjunction with two position spool valves 240 which are normally biased to a position to activate the drives for the upper loading platform 22. Thus, in the position illustrated in FIG. 14, the spool position of the selector valve 196 is such that the elevating cylinder 66 and drive motor 52 for the right hand conveyer of the upper platform may be energized by the control lever 226. It will be appreciated, however, that movement of the elevator platform 26 to a position of registry with the lower loading platform 20 will shift the spool of the selector valve 196 to the left, thereby energizing the elevating cylinder 66 and drive motor 52 for the right hand conveyer 48 of the lower platform. In either position of the selector valve 196, the operating lever 226 is adapted to simultaneously actuate the elevating cylinder 158 and the drive motor 159 for the elevator platform conveyer 150.

The lever 228 controls the drives for the right hand conveyer means, in the upper and lower conveyance paths 34. In the illustrated position of the spool 240 for the selector valve 197, the lever 228 will operate the drive motors 40b, 40d and 40f for the groups of conveying rollers 38 in the upper conveyance path 34. Again, upon movement of the elevator platform 26 to the lower loading position, the selector valve 197 will shift to the left to actuate the drive motors 40b, 40d and 40f for the conveyers 38 in the lower conveying path 34. In either position, the lever 228 may be operated to shift the spool valve 234 to the left to unload cargo modules in the conveyance paths 34 or to the right to load cargo modules into the paths 34. In the latter case, the cargo modules will pass over the intermediate cut-off actuator 206 without terminating operation of the motor 40d. Continued operation of motor 40d occurs because of a relatively large diameter bypass line 242 to the check valve 244, that is, the diameter is sufficiently enlarged to prevent bypass of hydraulic fluid to de-activate the motor 40d merely upon movement of a cargo module over the cut-off valve 206. However, upon continuing the movement of the cargo module to a rear position above the cut-off valve 202, a smaller diameter cut-off line 246, to back pressure valve 248, functions in the down position of the cut-off 246 to bypass the motor 40f and thereby de-activate the rear section of conveyer rollers 38. In this position, continuing movement of cargo modules over the cut-off valve 206 will still fail to generate sufficient bypass pressure in the line 242 to open the check valve 244. However, upon movement of a cargo module to a rest position above the cut-off valve 206 (so that this valve is held in depressed position), the back pressure in line 246 created through operation of the valve 248 will be sufficient to cause a bypass of hydraulic fluid through the line 242 and check valve 244. Such bypass effectively de-activates the motor 40d for the intermediate section of conveyer rollers 38.

It will be appreciated that the described operation of the cut-off valves 202 and 206 will occur only when the operating lever 228 has shifted the spool valve 234 to the right so that the flow of hydraulic fluid in the bypass lines 242 aNd 246 and effective to operate the check valve 244 and back pressure valve 248. In the opposite position of the spool valve 234, the valves 244 and 248 will be held closed to prevent any bypass operation. Accordingly, the cut-off valves 202 and 206 are rendered inoperative in the unloading mode of operation, and function only in the loading mode of operation wherein the cargo modules are moving rearward on the conveyer paths 34.

The control operations just described with respect to operating lever 228 will be substantially carried out by the operating lever 232 for the left hand conveyer drives, in that the operation of the drive motors 40a, 40c and 40e, and cut-off valves 200 and 204 will be substantially identical to the previously described operations with respect to the motors 40b, 40d, 40f and cut-off valves 202 and 206. The only difference is the simultaneous effect of the operating lever 232 to simultaneously energize the elevating cylinder 66 and drive motors 52 for the left hand conveyers 48. In all other respects, however, the drive motors 40a, 40c and 40e operate in substantially identical fashion, including the described response to the cut-off valves 200 and 204 for the rear and intermediate conveyer rollers 38.

The operating lever 230 functions to control the elevating cylinder 63 and drive motors 54 for the transverse conveyers 50. Again, the position of the selector valve 198 illustrated in FIG. 14 is such that the drive for the conveyers 50 on the upper platform would be capable of reversible control by the operating lever 230. As previously described, movement of the elevator platform to shift the selector valve 198 would actuate the lower drive while rendering the upper drive inactive.

Operation

Assuming the transport of large galley modules containing prepared meals and drinks, the cargo modules are first pre-loaded at a central kitchen or like facility for subsequent transport to one or more individual aircraft. The cargo transporter 10 receives the cargo modules at the central facility, where they may be loaded into the transporter from either end. For example, where the facility has a loading dock at a fixed elevation, the transporter 10 may be backed into position to receive the loaded cargo modules through the rear opening of the vehicle. However, in a typical operation, the transporter is nosed into the loading deck, and cargo modules are loaded across the elevator platform (in lowered position), through operation of the control levers 232 and 238 for the conveying paths 32 and 34, respectively.

The loaded transporter 10 now moves from the central facility to a loading position adjacent the aircraft. Such operation can be performed by a single operator who operates the transporter 10 from a position within the cab 14. In a loading operation with respect to large multijet aircraft, a separate loader is customarily positioned adjacent the aircraft to receive cargo from several cargo transporters of the type herein described. Such loader may employ one or more elevators to receive cargo from the transporter 10, and to load the same into the aircraft. To initiate such operation, the transporter moves under its own power to a position in general alignment with the loader, whereupon the operator moves from the cab 14 to the control station 28. From his position at station 28, the operator can control all loading and unloading operations through manipulation of the controls at panel 30. For example, it is convenient to first elevate the elevator platform 26 with the control lever 224, thereby shifting the selector valves 196–199 to energize the independently operable conveyer means for the upper loading platform 22. In this position of the equipment, shown in FIG. 15, the operator can move along the pathway 188 and depress the manual operating levers 172 and 180, to thereby block off conveying path 34 and open conveying path 32. Next, he can energize the drives for the lateral conveyers 50 and for the left hand conveyance path 32, by manipulating control levers 230 and 232 to shift the spool valves 234 to the right. In this position of the controls, he can actuate the drives for the elevator conveyers 150 and the right hand entry conveyer 48, by similarly manipulating lever 226 to shift its associated spool valve 234 to the right. Empty cargo modules 72 can now be moved from the loader over the entry rollers 250 and spring biased stops 190 onto the elevator platform 26. Upon contact with the drive wheels 150, the empty cargo modules are moved along a loading path generally represented by the arrows 82, 84 and 86. The first of the modules to reach a storage position at the rear of path 32 depresses the cut-off valve 200, thereby de-activating the rearmost section of roller conveyers 38. However, the forward and intermediate conveyer sections continue in the loading operation until such time as a cargo module 72, abutting the stored modules, depresses the cut-off valve 204 to terminate operation of the intermediate group of roller conveyers 38. The loading is completed by cooperation of the forward group of roller conveyers 38 with the left hand conveyer 48. Following this operation, the operator throws all control valves into the neutral position and moves along the pathway 188 to raise the stop levers 172 and 180, to thereby raise the guides 174, 175, 176 and the stop 178 holding the stored cargo modules 72 in a storage position within path 32. The operator can now shift the control lever 228 for the right hand conveyers 38, and again operate the lever 226 to load empty cargo modules 70 across the elevator platform 26 and into the right hand conveyance path 34. This operation is represented in FIG. 15 by the arrows 82 and 88. Such operation may be continued until the cargo modules achieve a storage position within the pathway 34, in substantially the manner just described. To complete the operation, the operator depresses the stop lever 172, raising the stop 170 to hold the cargo modules in the storage position (See FIG. 16).

Having loaded the empty cargo modules on the top loading platform 22, the operator shifts the lever 224 to lower the elevator platform to the unloading position shown in FIG. 16. In this position, the selector valves 196, 197, 198 and 199 are depressed, thereby energizing the independently operable drives for the lower loading platform 20. The operator now raises both of the stop levers 172 and 180 to position the various guides and stops on the platform 20 for unloading operations along the conveyance path 34. Unloading is accomplished by manipulating the control levers 226 and 224 for the conveyers 38 and 48, 150 on the loading platform and elevator, respectively, to move the modules in sequence onto the elevator platform 26. This particular operation is represented by the arrows 74 and 76 in FIG. 16. At such time as a cargo module is in position on the elevator platform 26, the operator can raise the elevator to its upper position (arrow 89) at which point he shifts the control 226 for the elevator conveyers causing the cargo module to be unloaded onto the intermediate loader and into the aircraft (arrow 91). (It will be appreciated that operation of the lever 224 at the upper elevator level performs no function with respect to the modules on platform 22, due to restraint of the modules 70 and 72 behind the stops 170 and 178, respectively). The described operation is then repeated in succession until all cargo modules on the path 34 have been unloaded into the aircraft. Next, the cargo modules 72 are unloaded from the conveyance path 32 through successive operation of the control 232 for the left hand rollers 38, control 230 for the transfer conveyers 50, and control 226 for the elevator platform conveyers 150. Such unloading operation is represented by the arrows 78, 80 and 76. Again, each cargo module is moved into position on the elevator platform 26 from which point it may be raised to a position adjacent the intermediate loader. In this regard, it may be appreciated that the elevator platform 26 may be adjusted to varying heights of an intermediate loader, as may be necessary for loading or unloading particular aircraft. When the entire loading operation has been completed, the operator can return to the cab 14 and transport the empty cargo modules to a central airport facility for reloading and re-use.

From the above, it will be understood that there has been described a highly useful mobile cargo transporting apparatus which facilitates the rapid loading and unloading of cargo modules with respect to aircraft. The transporter can be driven between central preparatory facilities and aircraft at various locations on the airport runways, by a single operator. Loading and unloading of a plurality of cargo modules can be controlled by the same operator from a more or less centralized position on the elevator platform 26. The cargo transporter 10 provides a further advantage of being highly adaptable to use with existing facilities, with respect to which it operates in a highly efficient manner to load and unload relatively large cargo modules and like large cargo containers, to and from passenger and cargo aircraft.

While the foregoing description has been related to a particular embodiment of a mobile loading apparatus, it is to be understood that many changes in construction and widely different embodiments and applications of the invention will suggest themselves to those skilled in the art to which this invention pertains. The disclosure and description herein are therefore to be considered as illustrative and not in any sense limiting except as expressed in the appended claims.

We claim:

1. Mobile loading apparatus comprising a vehicular frame powered for movement over the ground, a first fixed loading platform mounted on said vehicular frame, said first loading platform being provided with independently operable conveying means to move cargo modules lengthwise and transversely thereof, a second fixed loading platform mounted on said vehicular frame in vertically spaced relation to said first loading platform, said second loading platform also being provided with independently operable conveying means to move cargo modules lengthwise and transversely thereof, an elevator platform mounted for movement on said vehicular frame between separate positions of registry with respect to said fixed loading platforms, said elevator platform having independently operable conveying means adapted to cooperate with the conveying means of said fixed platforms, means on the elevator platform for controlling the independently operable converging means of said elevator and each of said fixed loading platforms, the independently operable conveying means of each of said fixed loading and elevator platforms extending above the surface thereof to facilitate loading and unloading operations from either end of said platforms and means responsive to the movements of said elevator platform to alternatively activate and de-activate the independently operable conveying means on said fixed platforms.

2. Mobile loading apparatus as in claim 1 wherein control means are carried by said movable platform for each of the independently operable conveying means of said fixed and movable platform means.

3. Mobile loading apparatus as in claim 2 wherein said movable platform additionally includes operator support means adjacent said control means.

4. Mobile loading apparatus as in claim 1 wherein each of said loading platforms is provided with at least two lengthwise conveying means and at least one lateral conveying means.

5. Mobile loading apparatus as in claim 1 wherein the independently operable conveying means of said fixed loading platforms include cut-off means operable upon movement of a cargo module thereover to de-energize portions of said cargo conveying means.

6. Mobile loading apparatus for handling cargo modules with respect to aircraft, a chassis powered for movement along the ground, a lower loading platform mounted in fixed position on said vehicular frame, an upper loading platform mounted in fixed position above said lower loading platform, each of said lower and upper loading platforms being provided with independently powered conveying means to move cargo modules lengthwise and transversely thereof, an elevator platform mounted for vertical movements between positions of registry with respect to said lower and upper loading platforms, said elevator platform being provided with independently powered conveying means to selectively move cargo modules on and off said upper and lower loading platforms, control means carried by said elevator platform for independently operating the conveying means of each of said lower, upper and elevator platform means, hoist means controlled from said elevator platform to move the elevator platform between said separate positions of registry with the fixed loading platforms, and means responsive to said vertical movements of said elevator platform to alternatively activate the independently powered conveying means of said lower and upper platforms for operation when the elevator platform is in a position of registry therewith.

7. Mobile loading apparatus as in claim 6 wherein each of said fixed and elevator loading platforms is provided with independently operable stop means to secure and hold the cargo modules in relatively fixed position on the separate transverse and lengthwise conveying sections thereof.

8. Mobile loading apparatus comprising a vehicular frame powered for movement over the ground, a first fixed loading platform mounted on said vehicular frame, said first loading platform being provided with independently operable conveying means to move cargo modules lengthwise and transversely thereover, a second fixed loading platform mounted on said frame in vertically spaced relation to said first loading platform, said second loading platform also being provided with independently operable conveying means to move cargo modules lengthwise and transversely thereover, a movable platform mounted on said vehicular frame for movement between separate positions of registry with said fixed loading platforms, said movable platform also being provided with independently operable conveying means adapted to cooperate with the conveying means of said fixed platforms, hoist means for said movable platform likewise mounted on said vehicular frame, control means on said movable platform for controlling said hoist means and the independently operable conveying means of said movable platform and each of said fixed loading platforms, and means responsive to the movements of said elevator platform to alternatively activate and de-activate the independently operable conveying means on said fixed platforms, the conveying means of said fixed and movable platforms enabling vehicle loading and unloading operations from each of said platforms.

* * * * *